(12) United States Patent
Kanno et al.

(10) Patent No.: US 6,243,352 B1
(45) Date of Patent: Jun. 5, 2001

(54) OPTICAL DISC AND OPTICAL DISC DEVICE

(75) Inventors: Masayoshi Kanno, Tokyo; Masataka Shinoda; Masahiko Kaneko, both of Kanagawa; Masato Hattori, Chiba; Shin Masuhara, Tokyo, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/086,987

(22) Filed: May 29, 1998

(30) Foreign Application Priority Data

May 30, 1997 (JP) .................................................. 9-142664

(51) Int. Cl.[7] ......................................................... G11B 7/00
(52) U.S. Cl. ........................................ 369/275.1; 369/47.1
(58) Field of Search .................................. 369/54, 58, 59, 369/42, 48, 13, 112, 116, 275.1, 275.2, 276, 272

(56) References Cited

U.S. PATENT DOCUMENTS 5,430,706   7/1995   Utsunomiya et al. .

FOREIGN PATENT DOCUMENTS 0 595 349 A1   4/1994   (EP) .
0 662 685 A1   12/1995  (EP) .

OTHER PUBLICATIONS

Patent Abstracts of Japan, vol. 097, No. 009, Sep. 30,1997 & JP 09 115176 A (Seiko Epson Corp.) May 2, 1997.

*Primary Examiner*—Muhammad Edun
(74) *Attorney, Agent, or Firm*—Sonnenschein, Nath & Rosenthal

(57) ABSTRACT

A novel optical disc which, while having interchangeability with a conventional MD or MD data, has a capacity far exceeding the capacity of these optical discs, and an optical disc device. The optical disc and the optical disc device take into account the constraints of the skew accompanying the increased recording density. By setting the jitter produced when recording random pattern signals on one track only to not more than 8.4% and by setting jitter increase on recording signals also on both side neighboring tracks to not more than 4.9%, the skew margin in the radial direction of not less than ±0.7° and that in the running direction (circumferential direction) of not less than ±0.6° are assured.

12 Claims, 15 Drawing Sheets

US 6,243,352 B1

OPTICAL DISC AND OPTICAL DISC DEVICE

BACKGROUND OF THE INVENTION

1. Field of the invention

This invention relates to a novel optical disc of a small diameter and a large capacity. More particularly, it relates to an optical disc device employing the optical disc.

2. Related Art

Large-capacity data, such as that for a still picture or a moving picture, is stored on a recording medium, such as an optical disc, and is random-accessed and reproduced whenever so required.

The optical disc can be random-accessed, and is higher in recording density than the magnetic recording medium, such as a so-called floppy disc, while data can be rewritten if the disc is a magneto-optical disc. Therefore, the optical disc is suited for storage of the large-capacity data.

Recently, a demand is raised for increasing the capacity of the optical disc further, such that, in view of ease in handling, development of a small-sized optical disc of a large capacity is incumbent.

As the small-sized optical disc, there is known a magneto-optical disc 64 mm in diameter, that is a so-called mini-disc (MD), while there has also been proposed so-called MD data for recording digital information signals. However, the recording capacity cannot be raised beyond 140 MB.

This recording capacity of 140 Mb cannot be said to be sufficient.

SUMMARY OF THE INVENTION

It is an object of the present invention to provide a novel optical disc which is interchangeable with the conventional MD or MD data and which nevertheless has a capacity significantly larger than these optical discs. It is another object of the present invention to provide an optical disc device employing this optical disc.

The optical disc according to the present invention achieves the user recording capacity exceeding 650 MB for the diameter of the recordable area thereof not larger than 65 mm. With the optical disc of the present invention, the jitter produced when random pattern signals are recorded on one track only is not more than 8.4% and jitter increase on recording signals also on both side neighboring tracks is not more than 4.9%.

An optical disc according to the present invention includes an optical disc and an optical system for illuminating a recording light beam and/or a reproducing light beam on the optical disc, wherein the optical system has a wavelength of 635 to 680 nm and a numerical aperture NA of 0.52±0.02, and wherein recording and/or reproduction is carried out in a range of the track pitch not less than 0.90 $\mu$m and not more than 1.00 $\mu$m, a bit length not less than 0.326 $\mu$m and not more than 0.362 $\mu$m and a product of the track pitch and the bit length not more than 0.326 $\mu$m$^2$.

An optical disc according to the present invention similarly includes an optical disc and an optical system for illuminating a recording light beam and/or a reproducing light beam on said optical disc, wherein the jitter produced when recording random-pattern signals on only one track of the optical disc is not more than 8.4% and wherein jitter increase on recording signal also on both side neighboring tracks is not more than 4.9%.

The present invention realizes an optical disc system which, while having interchangeability with the MD and MD data, has a user recording capacity not less than 650 MB which far exceeds the current recording capacity of 140 MB.

The capacity of 650 MB is selected in consideration that
(a) universal application can be instigated with the same capacity as the CD-ROM; and
(b) moving pictures continuing for not less than 20 minutes can be recorded at a transfer rate of 4 Mb/s required for actual MPEG2 pictures to make possible application to, for example, a digital video camera.

The optical disc and the optical disc device according to the present invention take into account the constraints of the skew accompanying the increased recording density. By setting the jitter produced when recording random pattern signals on one track only to not more than 8.4% and by setting jitter increase on recording signals also on both side neighboring tracks to not more than 4.9%, the skew margin in the radial direction of not less than ±0.7° and that in the running direction (circumferential direction) of not less than ±0.6° are assured. According to the present invention, there are provided an optical disc and an optical disc device having a hitherto unprecedented large capacity.

DESCRIPTION OF PREFERRED EMBODIMENTS

Figure 1:
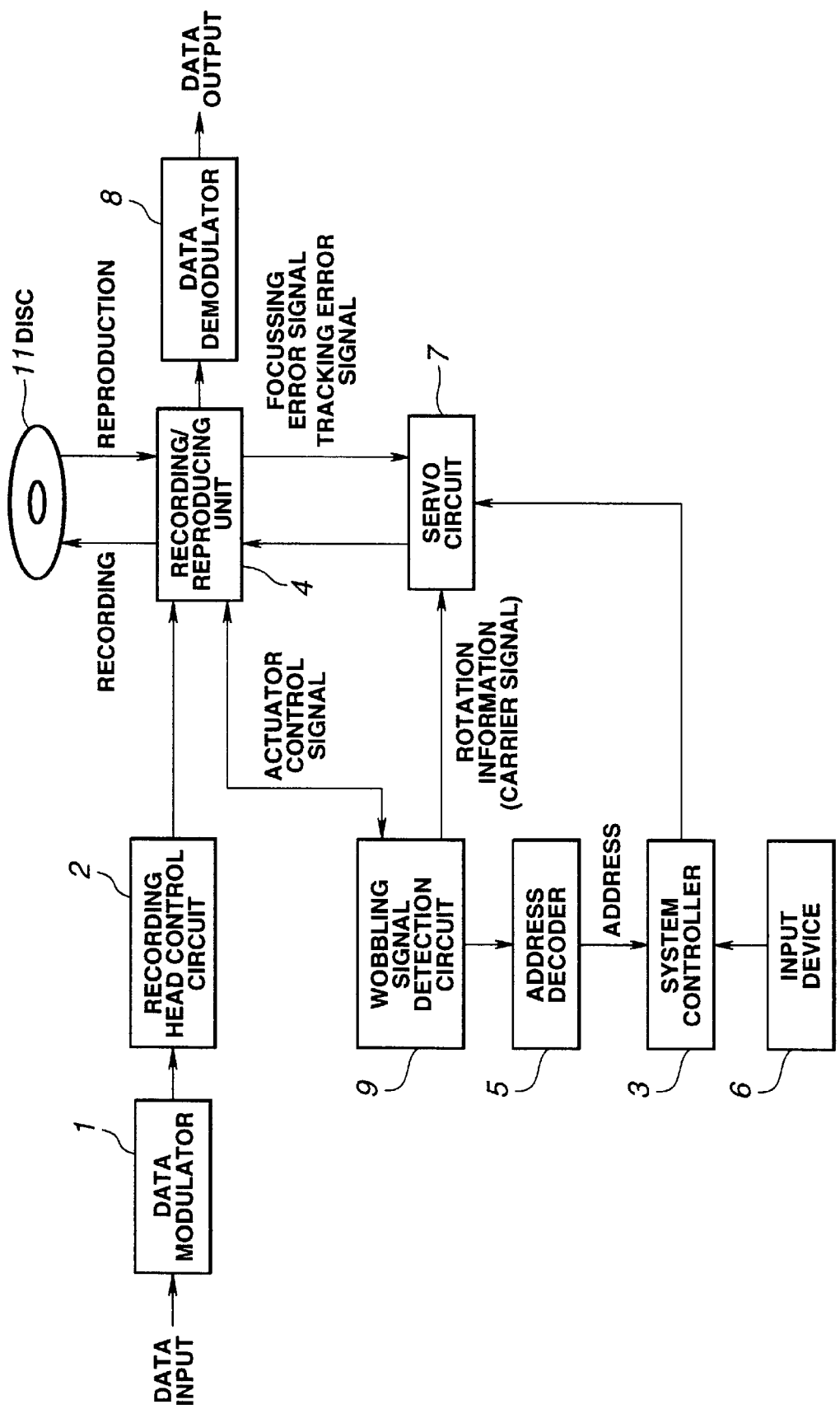
FIG. 1 is a block diagram showing an illustrative structure of a recording/reproducing system in an optical disc device.

Referring to the drawings and experimental results, an optical disc and an optical disc device of the present invention will be explained in detail.

Recording/Reproducing System

FIG. 1 shows the structure of an optical disc device in which a data modulator 1 converts pre-set input data into codes of a pre-set form for recording on a disc and outputs the codes to a recording head control circuit 2.

The recording head control circuit 2 furnishes control signals to a recording/reproducing head 21 (FIG. 2) of a recording/reproducing unit 4 to cause the codes supplied from the data modulator 1 to be recorded on a disc 11 (recording medium such as a magneto-optical disc).

The recording/reproducing 4 operates under control by the recording head control circuit 2 to record data (codes) on the disc 11, to illuminate a laser light beam on the disc 11, to receive the reflected light beam therefrom to read out the data (codes) recorded on the disc 11, to output the data (codes) to a data demodulator 8, to generate wobbling signals including tracking error signals, focussing error signals and the address information from the received reflected light, to output the tracking error signals and focussing error signals to a servo circuit 7 and to output wobbled signals to a wobbled signal detection circuit 9 (discriminating means).

The wobbled signal detection circuit 9 discriminates, from the wobbled signal supplied from the recording/reproducing unit 4, whether the track being recorded or reproduced is an odd-numbered track or an even-numbered track based on the wobbled signal supplied from the recording/reproducing unit 4, and outputs a signal representing the discriminated results (track discriminating signal) to an address decoder 5 (calculating means) while also converting the wobbled signal supplied from the recording/reproducing unit 4 into address information signals for outputting the address information signals to the address decoder 5.

The wobbled signal detection circuit 9 also extracts carrier signals from the wobbled signal supplied from the recording/reproducing 4 to output the extracted carrier signals to the servo circuit 7.

The address decoder 5 calculates addresses from the address information signals and track discrimination signals supplied from the wobbled signal detection circuit 9 to output the address to a system controller 3.

The system controller 3 outputs pre-set control signals to the servo circuit 7, in accordance with the address furnished from the address decoder 5 and, if a signal corresponding to a pre-set actuation is supplied from an input device 6, the system controller 3 outputs control signals corresponding to the actuation to the servo circuit 7 to control the recording/reproducing unit 4.

The servo circuit 7 is responsive to the focussing error signals and tracking error signals furnished from the recording/reproducing unit 4 to control a driving unit 22 of the recording/reproducing unit (FIG. 2) to move an optical head 34 in its entirety, and an objective lens 45 of the optical head 34 to adjust the focussing and tracking of the laser light used for data detection.

The servo circuit 7 controls a spindle motor 31 (FIG. 2) of the recording/reproducing unit 4, in accordance with the information on rotation from the wobbled signal detection circuit 9 to cause the disc 11 to be rotated at a pre-set velocity. The servo circuit 7 is also responsive to the control signals from the system controller 3 to control the recording/reproducing unit 4.

Figure 2:
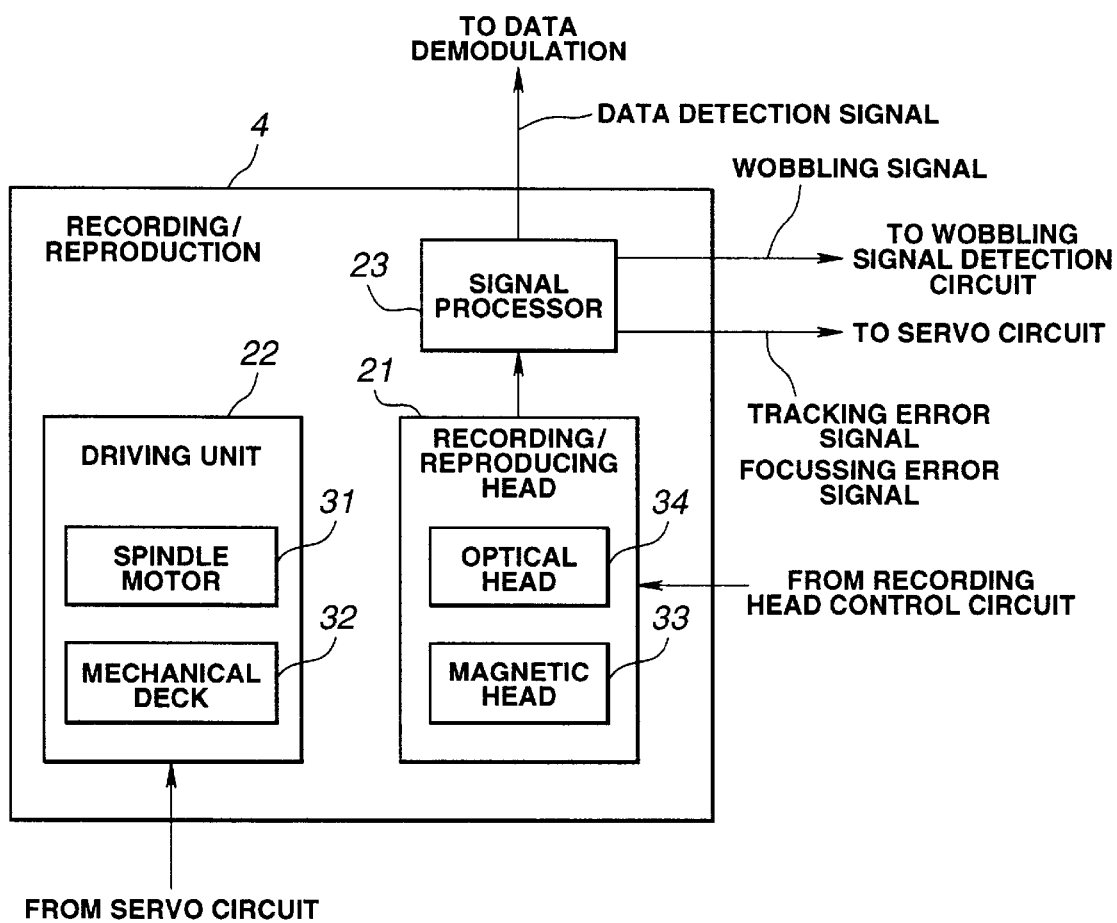
FIG. 2 is a block diagram showing an illustrative structure of a recording/reproducing unit.

FIG. 2 shows an illustrative structure of the recording/reproducing unit 4, in which a magnetic head 33 and the optical head 34 of the recording/reproducing head 21 are responsive to the control signals supplied from the recording head control circuit 2 to record pre-set data on the disc 11.

The optical head 34 illuminates a laser light beam on the disc 11 to receive the reflected light therefrom to output electrical signals corresponding to the received light volume to a signal processor 23.

The driving unit 22 includes a spindle motor 31 for running the disc 11 in rotation and a mechanical deck 32 for moving the recording/reproducing head 21 and is actuated responsive to control signals supplied from the servo circuit 7.

The signal processor 23 processes signals from the recording/reproducing head 21 to generate data detection signals, tracking error signals, focussing error signals and wobbled signals to output data detection signals to the data demodulator 8. The signal processor 23 also outputs the tracking error signals and the focussing error signals to the servo circuit 7, while also outputting wobbled signals to a wobbled signal detection circuit 9.

Double-Spiral Structure

In an optical disc, in particular a magneto-optical disc of the present invention, there is used a double-spiral structure.

An optical disc of the double-spiral structure is now explained.

Figure 3:
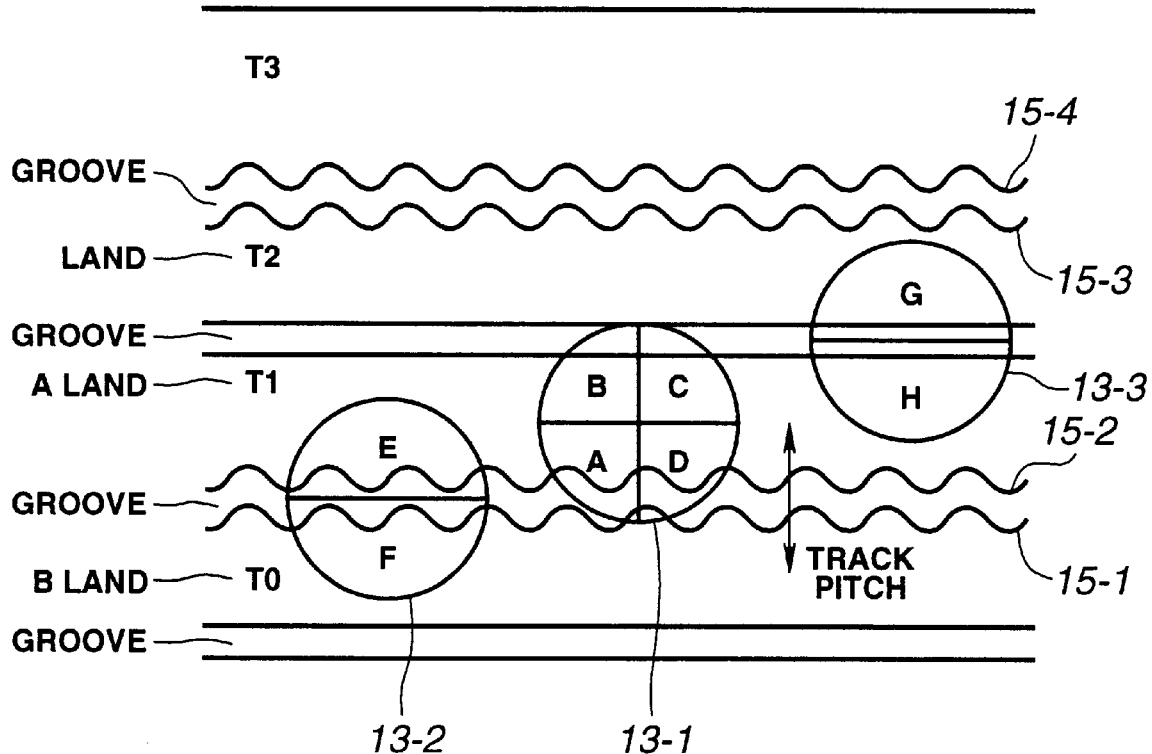
FIG. 3 is a schematic view showing an example of an optical disc having a double-spiral structure.

FIG. 3 shows an illustrative structure of the optical disc of the double-spiral structure in a plan view. In the illustrated structure, a track (recording area) is constituted by a land, with the track address being recorded by wobbling on left and right edges of a neighboring groove (non-recorded area) lying on the inner side of the track.

For example, the address information co-owned by a track (land) T0 and a track (land) T1 on its outer peripheral side is held as the shape of left and right edges 15-1 and 15-2 of a groove (non-recorded area) positioned between the tracks T0 and T1, while the address information co-owned by a track (land) T2 and a track (land) T3 on its outer peripheral side is held as the shape of left and right edges 15-3 and 15-4 of a groove (non-recorded area) positioned between the tracks T2 and T3.

Meanwhile, the address information for the track T1 only may be held by the edges 15-1 and 15-2, while the address information for the track T3 only may be held by the edges 15-3 and 15-4, so that the address information for the tracks T0 and T2 will be indirectly derived from the address information for the tracks T1 and T3.

In the optical disc, shown in FIG. 3, a laser light spot 13-1 for recording/reproducing data is illuminated so that its center will be at the center of a track, such as track T-1. Since the tracking servo system is the DPP system, both side laser light spots 13-2 and 13-3 (laser light spots for tracking error detection) are illuminated at the locations offset towards the inner rim or the outer rim of the disc 11 by a width equal to one-half of the track pitch, specifically between tracks T0 and T1 or between tracks T1 and T2. In this case, the crosstalk can be suppressed because none of the spots 13-2 and 13-3 is overlapped with wobbled edges of other tracks, herein the edges 15-3.

Meanwhile, the 3-spot type tracking servo can be performed by utilizing both side laser light beams of the three laser light beams, in which case the difference of the both side return laser light beams can be used as tracking error signals.

Thus, with the present optical disc, the two laser light spots 13-2, 13-3 (side beams) for tracking error detection are illuminated on edges 15-1 and 15-2 and edges between tracks T1 and T2, with an area between the track T1 and the track T0 and with an area between the track T1 and the track T2 as centers, and the return light is received by the photodiode 48A to detect the shape of the edges 15-1, 15-2 by the spot 13-2 to read out the address information of the track T1. It is noted that the track T1 is a track on which data is being recorded or reproduced, and the tracks T0 and T2 are adjacent to the inner periphery and outer periphery of the track, respectively.

Figure 4:
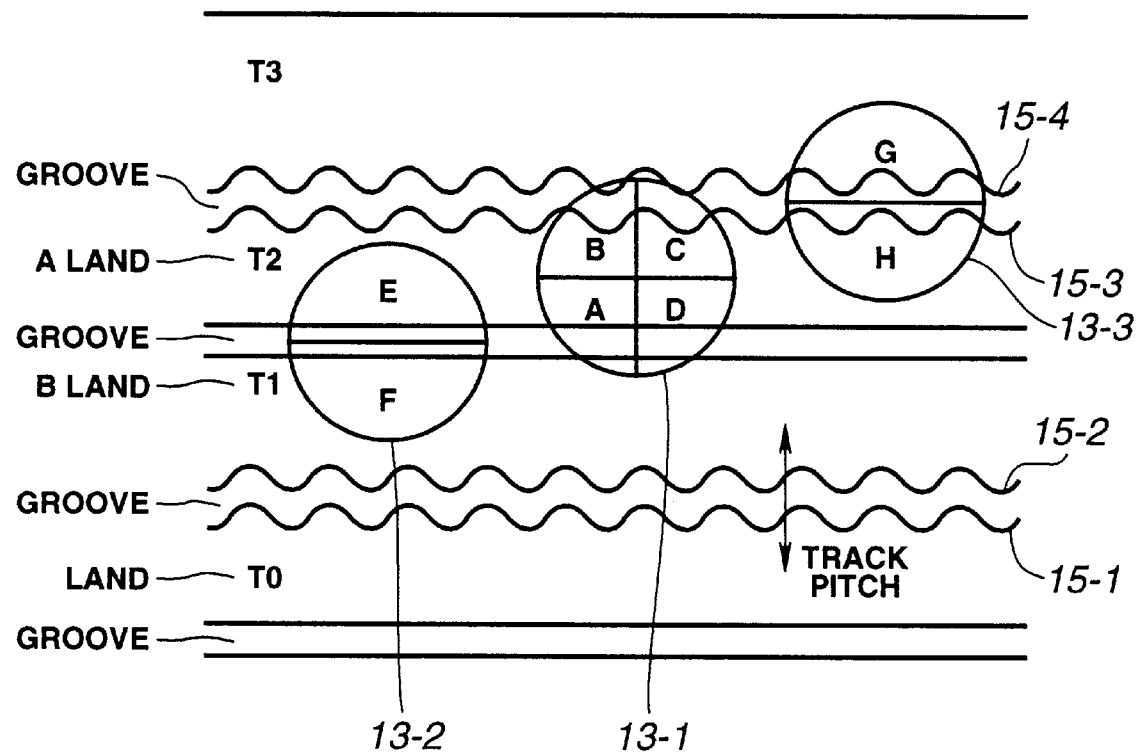
FIG. 4 is a schematic view showing an example of a spot position.

If data is recorded or reproduced on the track T2, the light spots 13-2 and 13-3 doe tracking error detection are illuminated on an edge between the tracks T1 and T2 and edges 15-3 and 15-4, with the area between the tracks T1 and t2 and with the area between the tacks T2 and t3 as centers, respectively, as shown in FIG. 4. The address information of the track T2 co-owned by the track t3 is read out from the shape of the edges 15-3 and 15-4 by the sot 13-3 of the laser light illuminate to an area between the tracks T2 and T3.

Figure 5:
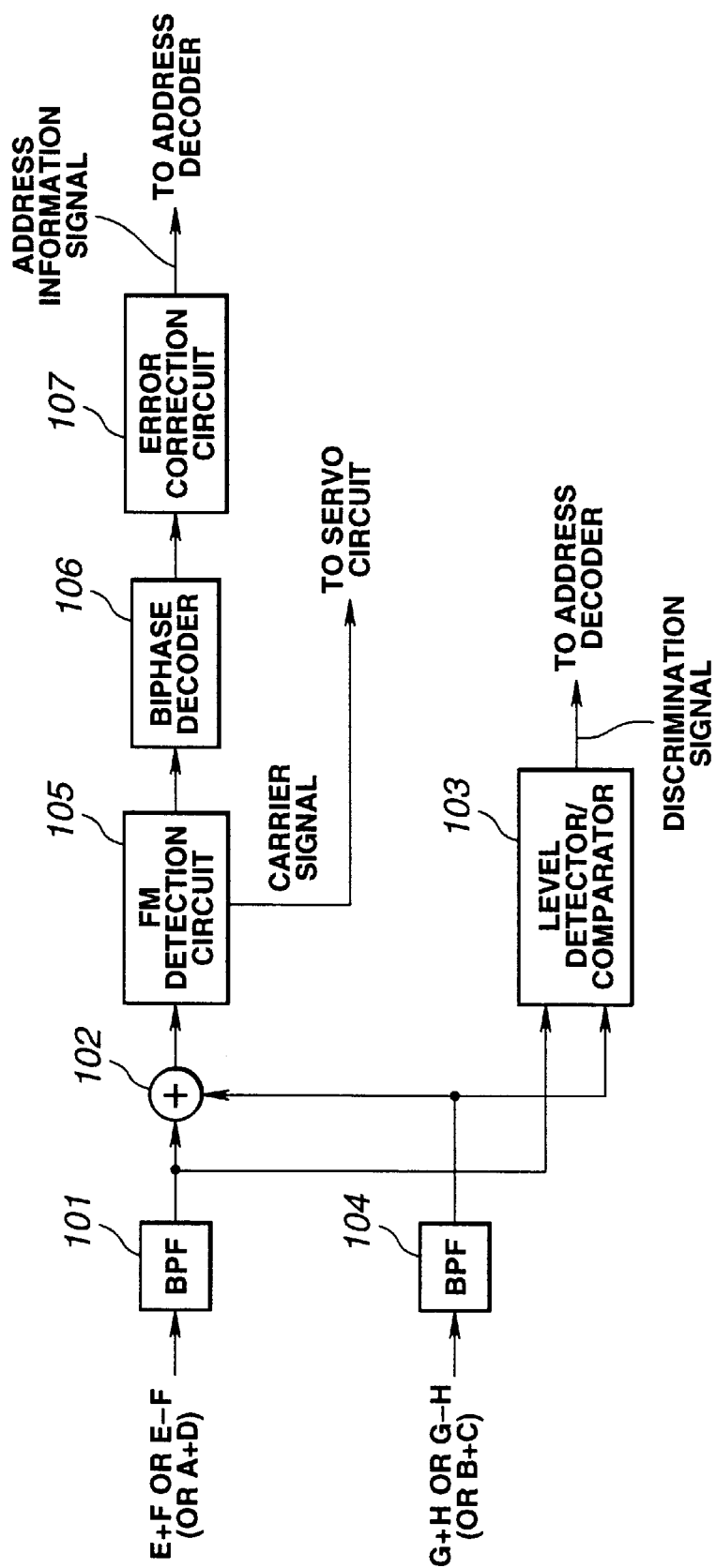
FIG. 5 is a block diagram showing an illustrative structure of a wobbled signal detection circuit.

Referring to FIG. 5, the wobbled signal detection circuit 9 of the recording/reproducing apparatus recording/reproducing the disc 11, in which left and right edges of a groove not constituting a track are wobbled in association with the address information every other track, as shown in FIG. 3, is explained.

In FIG. 5, a BPF 101 outputs to an adder 102 and a level detector/comparator 103 a signal which is the signal (E+F or E−F) supplied from a processing circuit 71 of the signal processor 23 and from which unneeded signal components are removed by extracting only frequency components of a pre-set range centered about the frequency of the carrier signals used for formulating the wobbled edges.

On the other hand, a BPF 104 outputs to then adder 102 and the level detector/comparator 103 a signal which is the signal (G+H or G−H) supplied from a processing circuit 73 of the signal processor 23 and from which unneeded signal components are removed by extracting only frequency components of a pre-set range centered about the frequency of the carrier signals used for formulating the wobbled edges.

The adder 102 calculates the sum of outputs of the BPFs 101 and 104 to send the resulting sum signal to a FM detection circuit 105.

The FM detection circuit 105 FM-detects the signal from the adder 102 to detect bi-phase signals which are outputted to a bi-phase decoder 106. The FM detection circuit 105 extracts the carrier signals from the signal supplied from the adder 102 to output the extracted carrier signals to the servo circuit 7.

The bi-phase decoder 106 decodes the bi-phase signal from the FM detection circuit 105 into the address information signal which is outputted to an error detection circuit 107.

The error detection circuit 107 corrects the address information signals supplied from the bi-phase decoder 106 for errors to output the error-corrected address information signals to the address decoder 105.

The level detector/comparator 103 compares the amplitude of an output signal of the BPF 101 to that of the signal from the BPF 104 for track discrimination.

If the laser light is illuminated as shown in FIG. 3 for data recording/reproduction, as shown in FIG. 3, signals E+F (or E−F) obtained on receiving the laser light illuminated on the wobbled edges 15-1 and 15-2 has a frequency in the vicinity of the frequency of the carrier signals. Thus, the output signal of the BPF 101 has a pre-set magnitude.

Conversely, a signal G+H (or G−H) obtained on receiving the laser light illuminated on the non-wobbled edge (edge between the tracks T1 and T2) contains only dc components, so that the output signal of the BPF 104 is substantially of a zero amplitude. Thus, by comparing outputs of the BPFs 101 and 104, it can be known whether the track currently recorded or reproduced is an even-numbered track or an odd-numbered track.

Thus, the address information is read out, at the same time as the track is discriminated, from the disc 11 in which the left and right edges 15-1 to 15-4 of the groove not constituting a track are wobbled in association with the address information.

Check into Ranges of Track Pitch and Bit Length

For achieving 650 MB which is the capacity 4.6 times the current capacity of 140 MB, it is necessary to use a light source of a shorter wavelength $\lambda$ and to raise the resolution of the optical system by raising the numerical aperture NA of the lens. It is also necessary to use an error correction system of high efficiency to lower the redundancy. If the product code is used to this end, the efficiency can be set to 80.3% instead of the conventional efficiency of 53.7%. For the efficiency of 80.3%, the surface density required for the capacity of 650 MB is represented by $pb<0.326\ \mu m^2$, where p and b denote the track pitch and the bit length, respectively.

Since $p=1.6\ \mu m$ and $b=0.555\ \mu m$ with the current MD and MD data, the condition for realizing the capacity of 650 MB with p and b being reduced uniformly is $p=0.96$ m and $b=0.34\ \mu m$.

The indices for the above surface density to hold system-wise are the radial skew margin of $\pm 0.7°$ or more and the skew margin along the running direction of $\pm 0.6°$ or more. Although the optical resolution is improved with $(NA/\lambda)$, the tolerance for the skew of the lens and the disc is proportionate to $\lambda/d(NA)^3$, so that the numerical aperture NA needs to be selected taking into account the balance between the resolution and the skew margin.

The substrate thickness $d=1.2$ mm cannot be modified in view of interchangeability with the currently used discs. Therefore, this substrate thickness is fixed. The wavelength was set to $\lambda=660$ nm as the practical short-wavelength light source and, as a result of detailed check, the numerical aperture $NA=0.52$ was found to be optimum.

Using the above optical system, photomagnetic recording films were formed on the following substrates for evaluation:

substrate diameter: 64.8 mm
groove structure: double spiral intermittent wobbling
wobble amplitude: 20 nm
groove depth: 70 nm
track pitch: 0.90 $\mu$m, 0.95 $\mu$m and 1.00 $\mu$m The substrate was a polycarbonate substrate having a thickness of 1.18 $\mu$m and the refractive index of 1.57, with the disc offset of 20 $\mu$m, double refraction in the perpendicular direction of $250\times 10^{-6}$, in-plane double refraction of $15\times 10^{-6}$, and the value of $\tan^{-1}(\eta k/\theta k)=10$ deg for Kerr ellipticity $\eta k$ and Kerr rotation angle $\theta k$.

The in-plane double refraction means the difference between the refractive index in the radial direction and that in the pickup running direction in the plane of the substrate surface and the double refraction in the perpendicular direction means the difference between the mean value of the in-plane refractive index and the refractive index along the direction of the substrate thickness.

Figure 6:
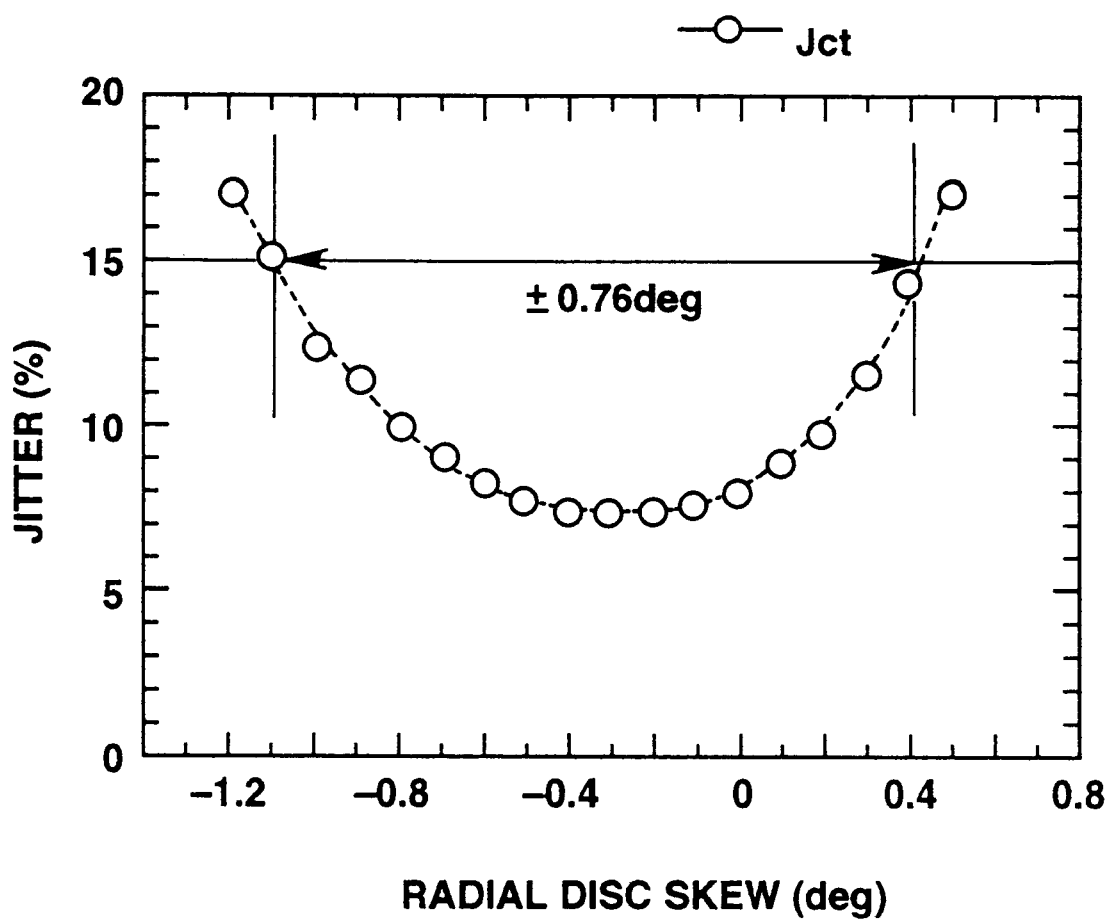
FIG. 6 is a graph showing the relation between disc skew and jitter.

Next, (1,7) RLL random data were recorded by magnetic field modulation recording under the following conditions:
linear velocity: 2.00 m/s
track pitch: 0.95 $\mu$m bit length: 0.34 μm
laser light wavelength: 660 nm
lens NA: 0.52
recording power: 7.7 mW
pulse light duty: 47%
recording magnetic field: 12 kA/m
reproducing light power: 0.8 mW The signals recorded both in the neighboring track and in the main track were reproduced as disc skew is applied in the radial direction in order to measure random jitter Jct n the co-existence of crosstalk as shown in FIG.6. It is noted that, while jitter is worsened by disc skew, the index of system failure is 15% in terms of the magnitude of the standard deviation of jitter normalized with the clocks. The range of the skew for which jitter is comprised in a range lower than this magnitude (skew margin) was found from FIG. 6 to be ±0.76°.

Similarly, jitter was measured as skew was applied in the running direction, and the skew margin in the running direction of ±0.65° was obtained.

These values represent sufficient tolerances for the system to operate with stability on occurrence of skew in the disc and in the optical system.

Then, (1,7) RLL random data were recorded by magnetic field modulation recording on an neighboring track under the following conditions:
linear velocity: 2.00 m/s
laser light wavelength: 660 nm
lens NA: 0.52
recording power: 7.7 mW
pulse light duty: 47%
recording magnetic field: 12 kA/m
reproducing light power: 0.8 mW The pit length was set to 0.35 μm, 0.33 μm and 0.315 μm for the track pitch of 0.90 μm, 0.95 μm and 1.00 μm, respectively, for maintaining a constant surface density which gives a capacity not less than 650 MB.

Figure 7:
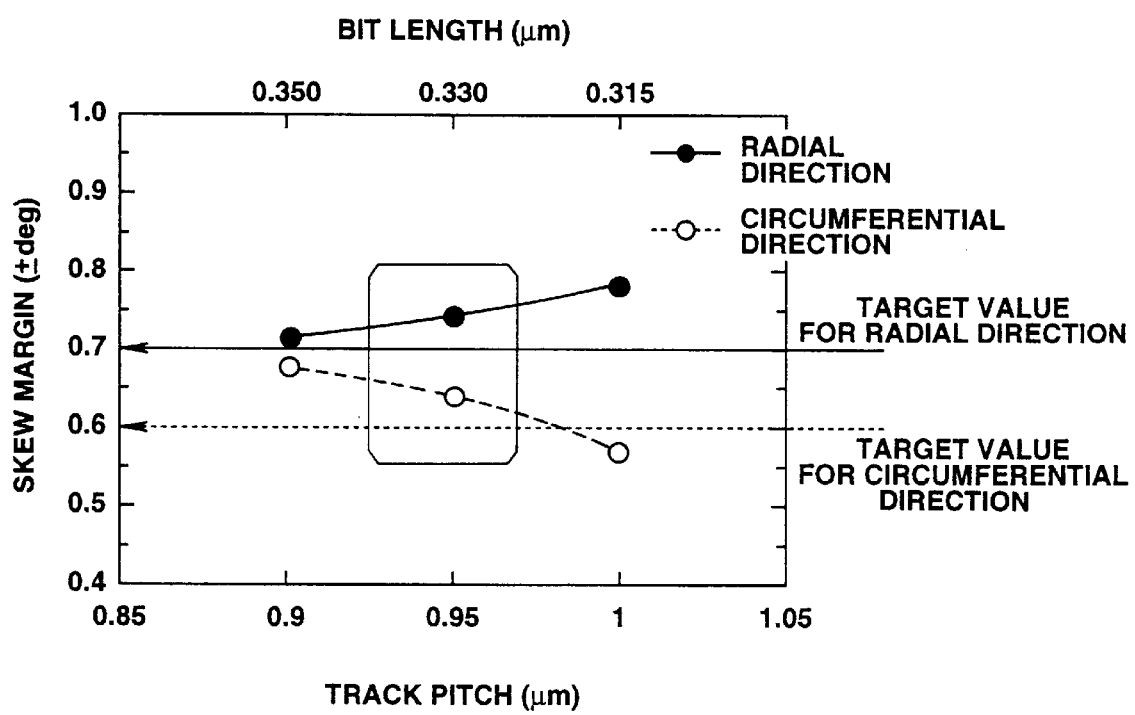
FIG. 7 is a graph showing the relation between the track pitch, bit length and skew margin.

The signals recorded on both a neighboring track and on the main track were reproduced as disc skew was applied in both the radial direction and in the running direction in order to measure random jitter. The results obtained are shown in FIG. 7.

It is seen from this that, for the track pitch of 0.95 μm and the pit length of 0.33 μm, the radial skew margin and the skew margin in the running direction of ±0.60° or more, as required from the system side, are assured with sufficient allowance.

If the track pitch is 0.90 μm and the pit length is 0.35 μm, the skew margin in the running direction of ±0.60° or more is realized with certain allowance. However, the radial skew margin is barely ±0.7°, such that, if the track pitch is smaller than this value, system failure occurs. If the track pitch is 1.00 μm and the bit length is 0.315 μm, the skew margin in the running direction is not larger than ±0.60°, thus causing system failure.

It is seen from above that the condition for the system to hold good against disc skew with the disc capacity being not less than 650 MB is the area surrounded by
pb=0.326 μm²
0.90 μm≦p≦1.00 μm
0.326 μm≦b≦0.363 μm.
Range of J0, ΔJ to Assure Skew Margin In order to assure the radial skew margin required from the system of ±0.7° or more and the skew margin in the running direction of ±0.6° or more, it is effective to know the physical quantity directly governing the skew margin to suppress the physical quantity to within the required range.

The present inventors have checked the relation between a number of physical quantities and the skew margin and found that the increase in jitter when recording only one track and that when simultaneously recording both neighboring tracks are directly related with both skew margins. The definition and the method for measuring the increase in jitter are hereinafter explained.

The jitter J0 was measured when using the unskewed disc which gave the results of FIG. 6 and when only one track was recorded with the neighboring tracks being in the erase state. The jitter J0 was 8.0%.

The jitter Jct when random data was recorded in the neighboring track and when the initial main track was reproduced was 8.3%.

Since the crosstalk from the neighboring track is responsible for this difference, this jitter increase corresponding to the crosstalk ΔJ was defined by $\Delta Jct^2 = J0^2 + \Delta J^2$ which was measured and found to be 2.0%.

If J0 and ΔJ are of small magnitudes, as in the present example, the radial skew margin of ±0.76° and the skew margin in the running direction of ±0.65° were obtained, as described above, thus sufficiently meeting the demand. With the present disc, the carrier to noise ratio (CNR) when recording the carrier of a sole frequency of 2.2 MHz was found to be 42 dB (RBW=30 kHz).

Next, for finding limit values of J0 and ΔJ satisfying the system demand, a photomagnetic recording film was formed on the following substrate for evaluating the limit values of J0 and ΔJ:
substrate diameter: 64.8 mm
groove structure: double spiral intermittent wobbling
wobbling amplitude: 20 nm
groove depth: 70 nm
land duty: 65%
track pitch: 0.95 μm With the thickness of 1.18 mm and the refractive index of 1.57 of the substrate, formed of polycarbonate, measurement was conducted on various substrates for various types of the materials and various annealing conditions.

(1,7) RLL random data were recorded by magnetic field modulation recording under the following conditions:
linear velocity: 2.00 m/s
laser light wavelength: 660 nm
lens NA: 0.52
bit length: 0.34 μm
recording power: 7.7 mW
pulse light duty: 47%
recording magnetic field: 12 kA/m Also, the carrier to noise ratio (CNR) when recording the carrier of a sole frequency of 2.2 MHz was measured under the conditions of the linear velocity of 2.00 m/s, recording power of 7.7 mW, pulse light duty of 47%, recording magnetic field of 12 kA/m and RBW of 30 kHz.

For various discs, J0, ΔJ, CNR, radial skew margin and skew margin in the running direction were measured.

Figure 8:
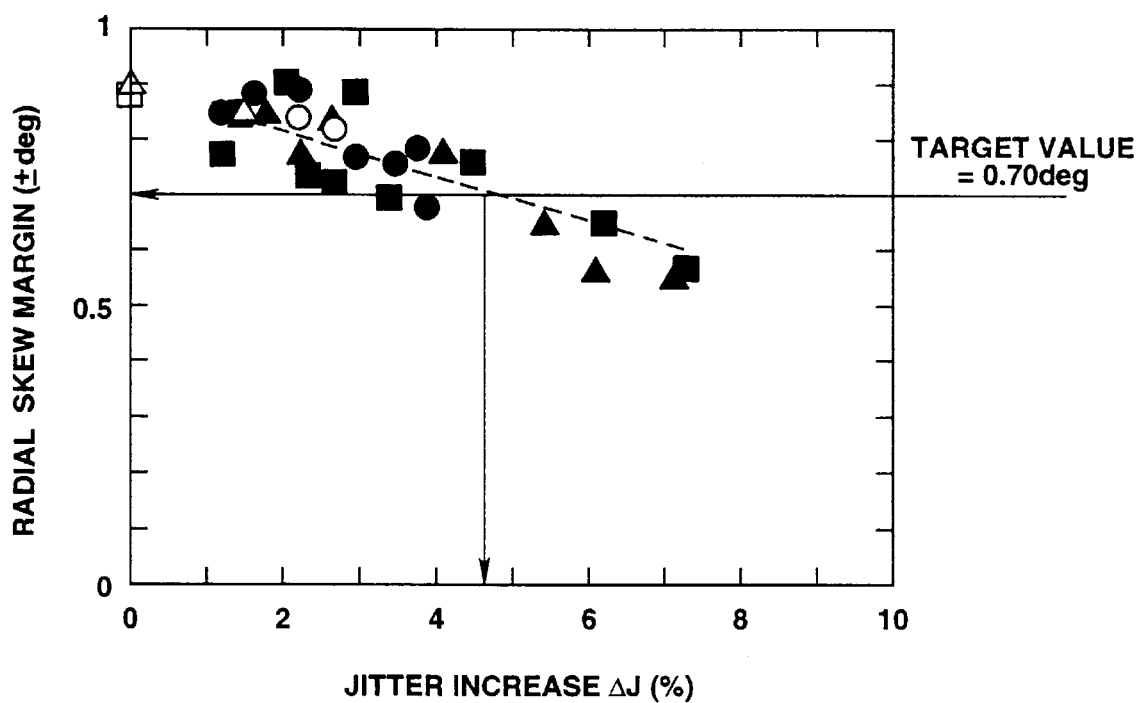
FIG. 8 is a graph showing the relation between the jitter increase and radial skew margin.

With the disc of CNR of 38 dB and Δj=1.7%, the radial skew margin was ±0.67°. It was found that the skew margin is not met if ΔJ is small but the CNR is low. Therefore, the relation between ΔJ and the radial skew margin was found only for discs having the CNR exceeding 40 dB. The result is shown in FIG. 8, from which it is seen that ΔJ≦4.9% is required in order for the skew margin to exceed ±0.7°.

Figure 9:
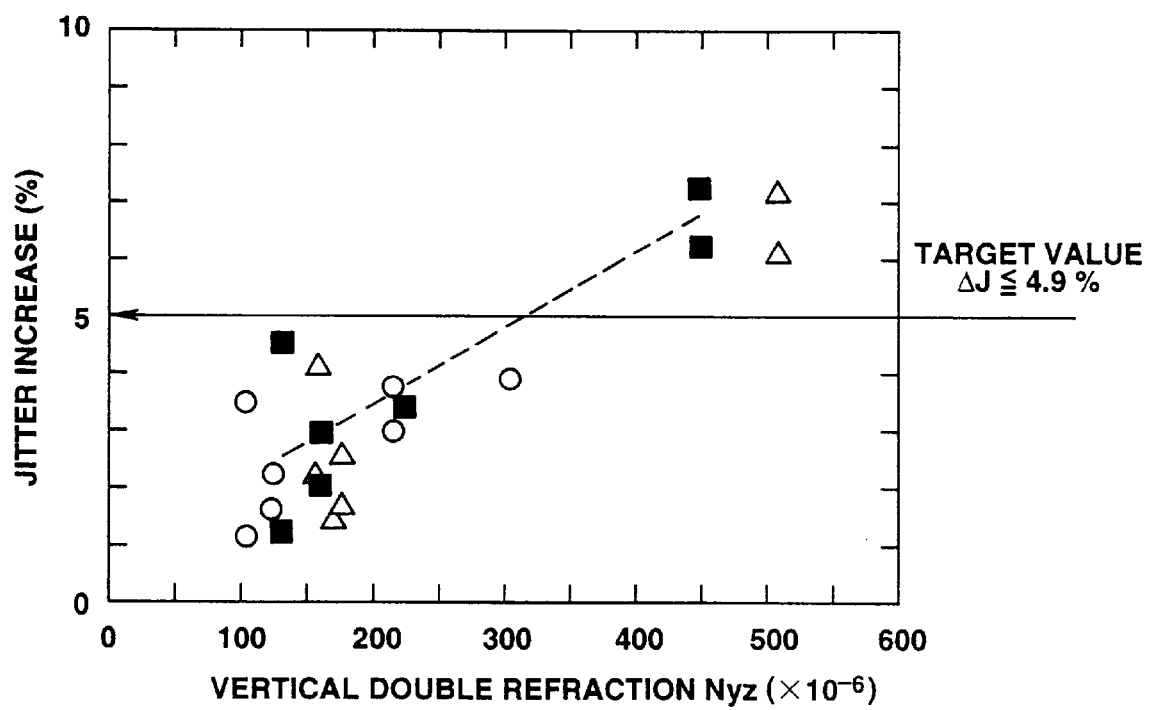
FIG. 9 is a graph showing the relation between vertical double refraction and jitter increase.

The relation between ΔJ and perpendicular double refraction was also found. The result is shown in FIG. 9, from which it is seen that, in order for ΔJ<4.9% to hold, the perpendicular double refraction needs to be $300 \times 10^{-6}$ or less.

Figure 10:
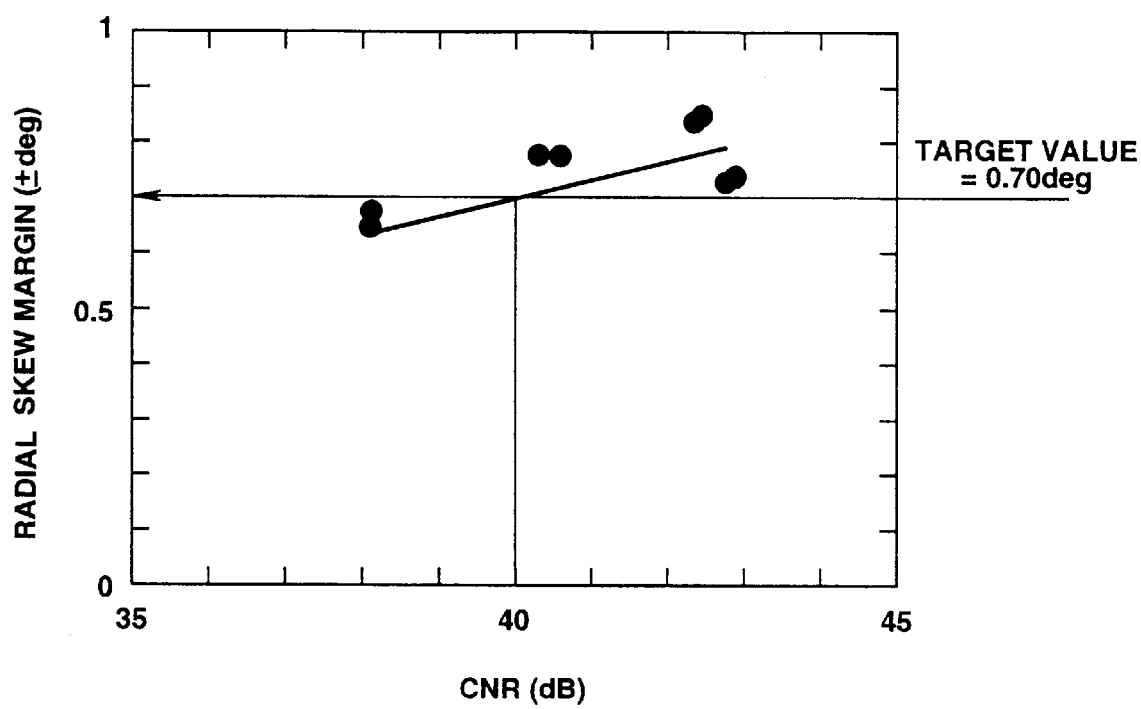
FIG. 10 is a graph showing the relation between radial skew margin and CNR.
Figure 11:
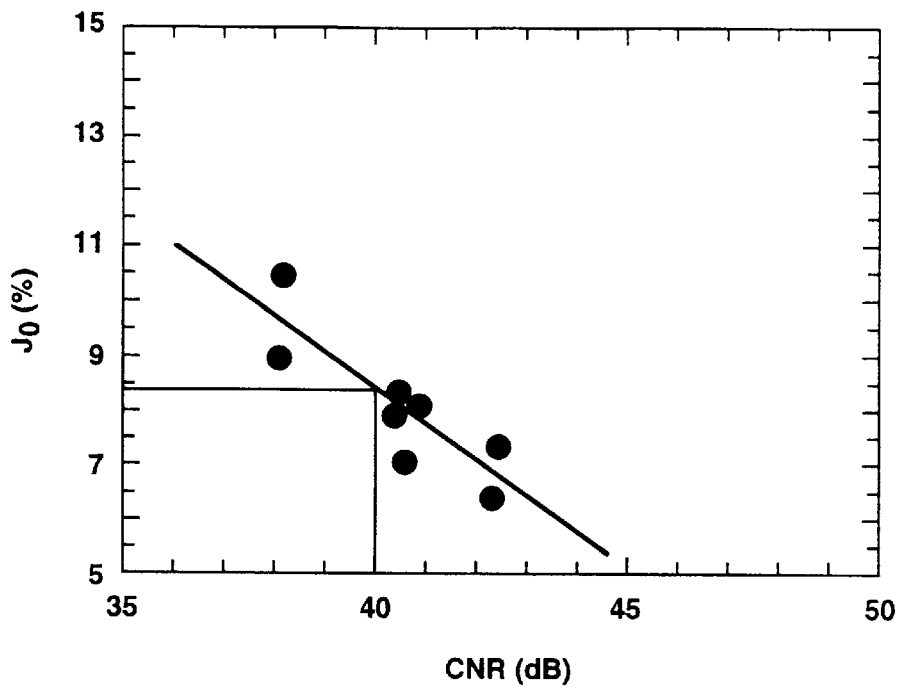
FIG. 11 is a graph showing the relation between J0 and CNR.

Next, discs satisfying Δ<4.9% were elected to find the relation between the radial skew margin and CNR. The results are shown in FIG. 10, from which it is seen that J0<8.4% is required in order for CNR<40 dB to hold, and in order for the radial skew margin to exceed ±0.7°.

If these are met, the skew margin in the running direction of not less than ±0.6° is obtained, as was confirmed by separate measurement.

It is seen from above that, for assuring the radial skew margin of ±0.7° or more and the skew margin in the running direction of ±0.6° or more, it suffices if such a disc is used in which the jitter J0 when recording only one track is not larger than 8.4% (J0≦8.4%) and in which the increase in jitter when recording both neighboring tacks is not larger than 4.9% (ΔJ≦4.9%).

Also, for J0<8.4%, it is necessary that CNR≦40 dB, whereas, for ΔJ≦4.9%, the perpendicular double refraction needs to be $300 \times 10^{-6}$ or less.

Meanwhile, since the in-plane double refraction and Kerr ellipticity affect the crosstalk, it is desirable that the absolute values of the in-plane double refraction and $\tan^{-1}(\eta k/\theta k)$ shall be $25 \times 10^{-6}$ or less and 15 deg or less, respectively.

By employing a disc satisfying the above characteristics, the radial skew margin of ±0.7° or more and the skew margin in the running direction of not less than ±0.6° are assured. If, in system designing in this line, the radial disc skew of 0.3°, the radial skew of the optical pickup of 0.4°, the disc skew in the running direction (circumferential direction) of 0.2° and the skew of the optical pickup in the running direction of 0.4° are allowed, designing with sufficient allowance can be realized. Therefore, the disc skew in the radial direction of 0.3° or less and the disc skew in the running direction of 0.2 or less are thought to be desirable.

Method for Prescribing the Recording Power Margin and Recording Magnetic Field Margin A photomagnetic recording film was first formed on the following substrate:
substrate diameter: 64.8 mm
groove structure: double spiral intermittent wobbling
wobbling amplitude: 20 nm
groove depth: 70 nm
land duty: 65%
track pitch: 0.95 μm The substrate thickness was 1.18 mm, and the substrate was of polycarbonate and had the refractive index of 1.57. The substrate also showed perpendicular double refraction of $250 \times 10^{-6}$ and the in-plane double refraction of $15 \times 10^{-6}$.

Figure 12:
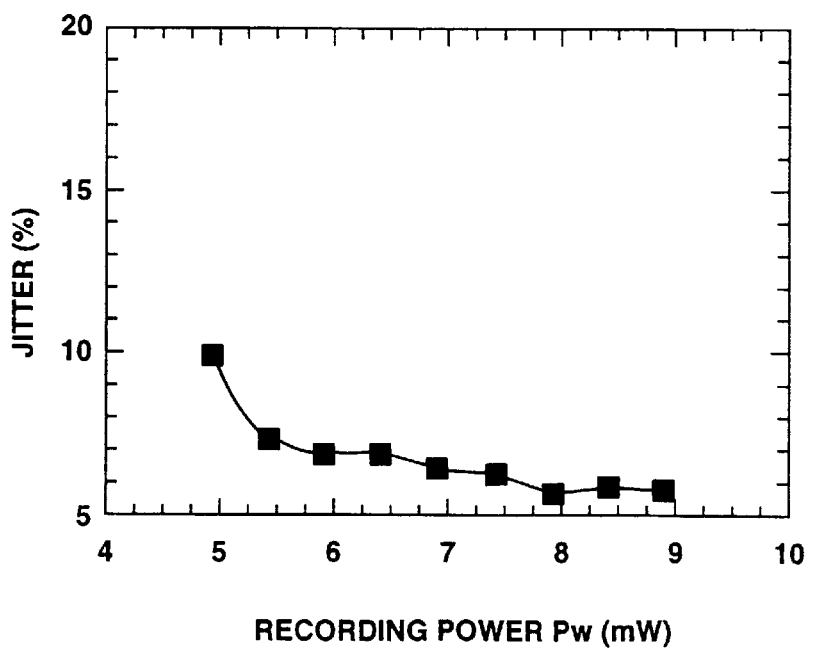
FIG. 12 is a graph showing the relation between jitter and the recording power when recording only one track as the recording power is varied.

Next, (1,7) RLL random data were recorded by magnetic field modulation under the following conditions:
linear velocity: 2.00 m/s
laser light wavelength: 660 nm
lens NA: 0.52
bit length: 0.34 μm
pulse light duty: 47%
recording magnetic field: 12 kA/m First, the jitter when recording only one track using variable recording power values was as shown in FIG. 12.

Figure 13:
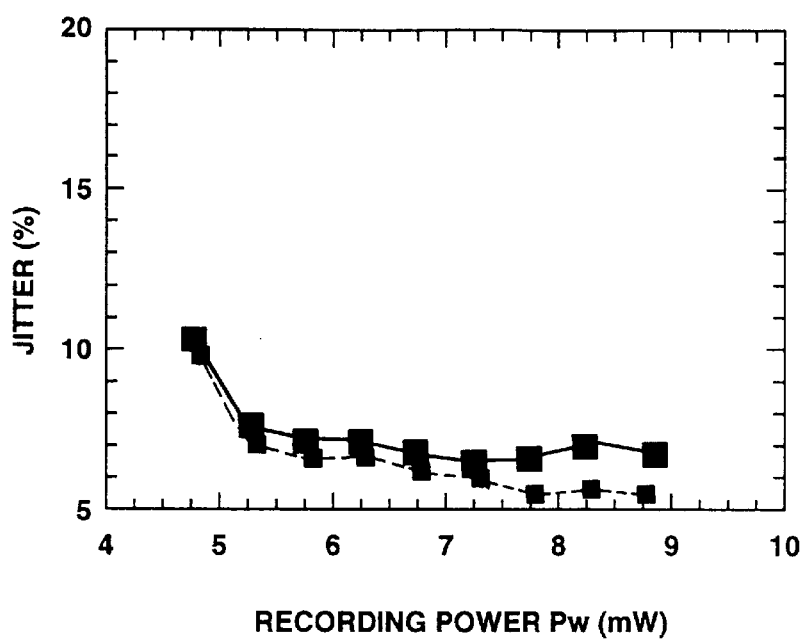
FIG. 13 is a graph showing the relation between jitter and the recording power when jitter J0 of a main track is measured as the recording power of a neighboring track is varied.
Figure 14:
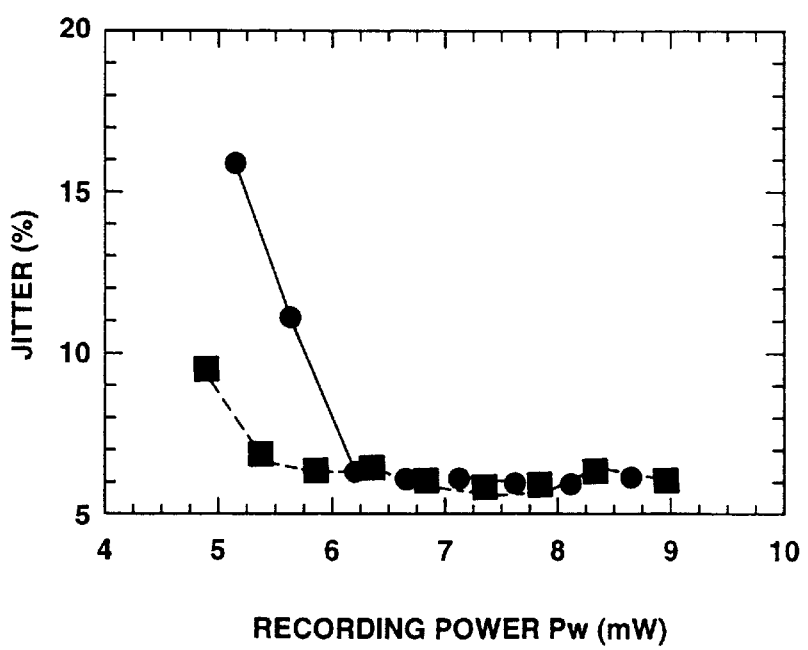
FIG. 14 is a graph showing the relation between jitter and the recording power when the main track is recorded with a power of 8.5 mW and subsequently overwritten as the recording power is lowered.

Then, jitter J0 of the main track was measured as the recording power of the neighboring tracks was varied. The results are as shown in FIG. 13, from which it is seen that jitter Jct is lowered due to crosstalk from the neighboring tracks under a high power. If the main track is recorded with the power of 8.5 mW at which jitter begins to deteriorate and the main track is then overwritten as the recording power is lowered, jitter deterioration due to insufficient erasure on overwriting is noticed at a low power, as shown in FIG. 14. The upper and lower limits of the recording power are determined by the above-described series of measurements. If Pw=7.7 mW, as an optimum recording power, J0<8.4% and Δj<4.9% are met for an optional recording power ranging between 0.8 Pw=6.2 mW or more and 1.1 Pw=8.5 mW or less. From the above experimental results, it can be assured that sufficient system-wise skew margin may be realized for this recording power range.

Similar measurements were conducted for the recording magnetic field of 20 kA/m and the recording power of 7.7 mW and J0=7.5% and Δj=2.0% were obtained.

It is seen from above that, with the optimum recording power Pw=7.7 mW, J0<8.4% and ΔJ<4.9% are met for an area between 0.8 Pw or more and 1.1 Pw or less and between 12 kA/m or more and 20 kA/ or less of the recording magnetic field.

Figure 15:
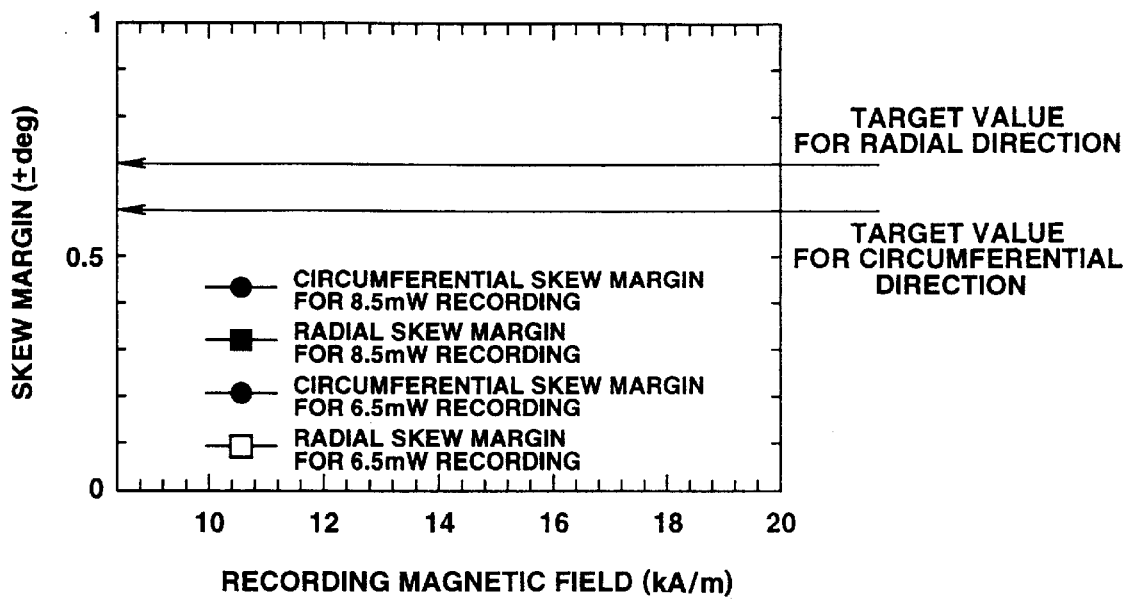
FIG. 15 is a graph showing the relation between the recording magnetic field and the skew margin.

In association therewith, the radial skew margin and the skew margin in the running direction were measured for the recording power of 6.5 mW and 8.5 mW and the recording magnetic field of 12 to 20 kA/m. The results are shown in FIG. 15, from which it is seen that the required skew margin is sufficiently obtained in the entire measurement range.

Discrimination of Tracks A and B

In a double-spiral structure optical disc, there are two types of the signal recording tracks, that is a track A delimited between an inner rim side straight groove and an outer rim side wobbled groove and a track B delimited between an inner rim side wobbled track and an outer rim side straight groove.

By reading the address information in the wobbled groove by a three-spot method, the tracks A and B can be discriminated simultaneously. That is, referring to FIG. 3, the address carrier signal Cout reproduced by the outer rim side spot is compared to the address carrier signal Cin reproduced by the inner rim side sot, as the address information is reproduced by the main spot. If Cout is sufficiently larger than Cin, it may be judged to be the track A that is being scanned.

Meanwhile, it is necessary to allow for deviation of a side spot from the groove center by the phase difference of ±45°(equal to p/8, that is ±0.12 μm for the track pitch p of 0.95 μm) due to errors in the player or disc manufacture. Since the relative deviation of both side spots of 90° at the maximum is allowed, a sufficient radial skew margin is required even in this case.

Thus, a photomagnetic recording film was formed on the following substrate:
substrate diameter: 64.8 mm
groove structure: double spiral intermittent wobbling
wobbling amplitude: 20 nm
groove depth: 70 nm
land duty: 65%
track pitch: 0.95 μm The substrate was 1.18 mm in thickness and was formed of polycarbonate with the refractive index of 1.57.

The ratio of Cout/Cin when the intentional deviation between both side spots is not produced is set to Cw/Cs and, using Cw/Cs as a parameter, the track discrimination error frequency for the relative deviation between both side spots of 90° was measured by an optical system having the laser light wavelength of 660 nm and the lens NA of 0.52.

Figure 16:
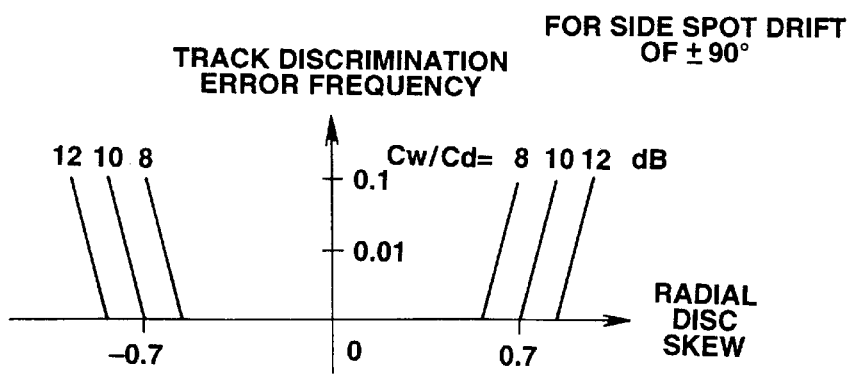
FIG. 16 is a graph showing the relation between the radial skew and the track discrimination error frequency for a side spot deviation of 90°.

The results are as shown in FIG. 16, from which it is seen that Cw/Cs≧10 dB is required for discriminating the track types with a sufficient skew margin.

Check into Land Duty

Optimally, the groove depth is 60 to 80 nm, the wobbling amplitude of the wobbled groove is 15 to 25 nm, and the push-pull signal is 0.04 to 0.08. The push-pull signal is defined as a magnitude of the difference signal of the two-segment photodetector normalized with the low-frequency sum signal.

A number of stampers varied by oscillating the groove width were fabricated and the groove width of each stamper was measured by a scanning electron microscope (SEM). Since there is a tilt in the boundary between the land and the groove, the width W1 not containing the inclined portion as the groove width and the width W2 containing the inclined portions on both sides are measured. The land duty D is defined by D=1−(W1+W2)2p, where p is the track pitch.

A photomagnetic recording film was formed on each of a number of substrates having different values of the defined land duty and evaluated as follows:
substrate diameter: 64.8 mm
groove structure: double spiral intermittent wobbling
wobbling amplitude: 20 nm
groove depth: 70 nm
track pitch: 0.95 $\mu$m The substrate was a polycarbonate substrate having a thickness of 1.18 $\mu$m and the refractive index of 1.57, with the disc offset of 20 $\mu$m, double refraction in the perpendicular direction of $250 \times 10^{-6}$, in-plane double refraction of $15 \times 10^{-6}$, and the value of $\tan^{-1}(\eta k/\theta k)=10$ deg for Kerr ellipticity $\eta k$ and Kerr rotation angle $\theta k$.

Figure 17:
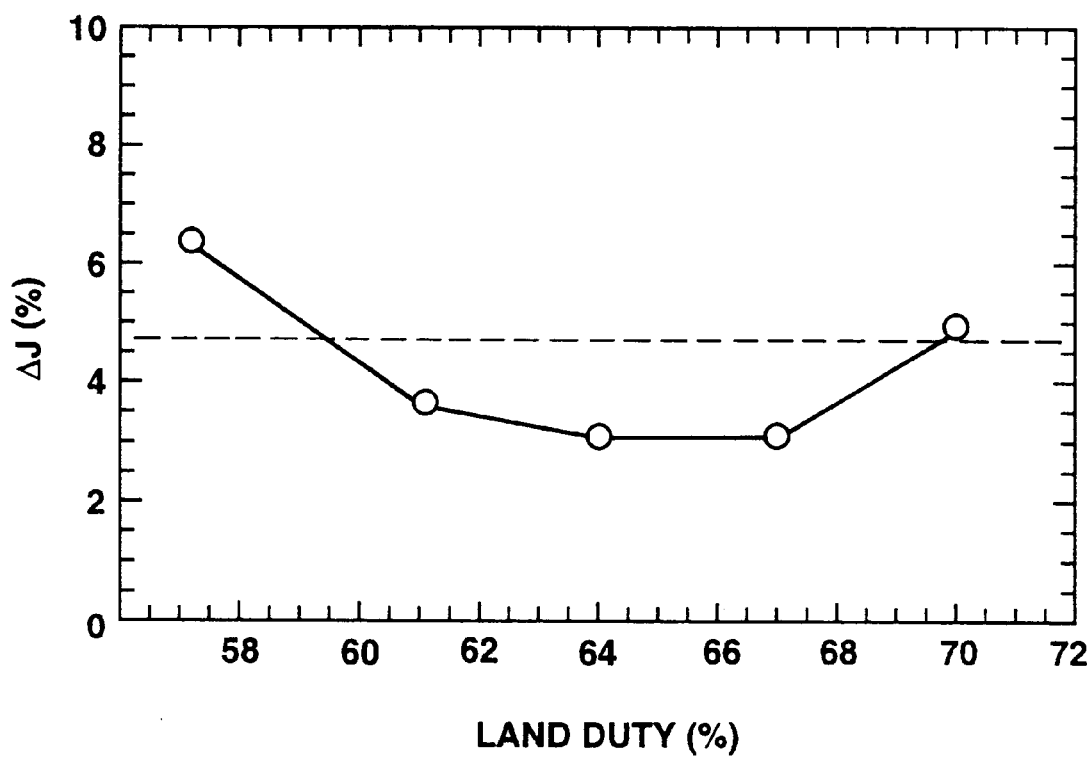
FIG. 17 is a graph showing the relation between land duty and jitter increase.

(1,7) RLL random data were recorded by magnetic field modulation recording under the following conditions:
linear velocity: 2.00 m/s
laser light wavelength: 660 nm
lens NA: 0.52
bit length: 0.34 $\mu$m
pulse light duty: 47%
recording magnetic field: 12 kA/m FIG. 17 shows the measured value of $\Delta J$ with respect to the land duty. It is seen that, if the land duty is too small or too large, $\Delta J$ is increased, such that, in order for $\Delta J$ to be not larger than 4.9% ($\Delta J<4.9\%$), the land duty is preferably 61 to 69%.

Ratio of Address carrier Signal (84.672 kHz) to Noise

A photomagnetic recording film was formed on the following substrate:
substrate diameter: 64.8 mm
groove structure: double spiral intermittent wobbling
wobbling amplitude: 20 nm
groove depth: 70 nm
land duty: 65%
track pitch: 0.95 $\mu$m The substrate is a polycarbonate substrate having a thickness of 1.18 mm and the refractive index of 1.57.

By varying the wobbling amplitude, three substrates were prepared having zones in which the ratio of the address carrier signal (84.672 kHz) to noise was 30, 33 and 36 dB (RBW3 kHz).

Figure 18:
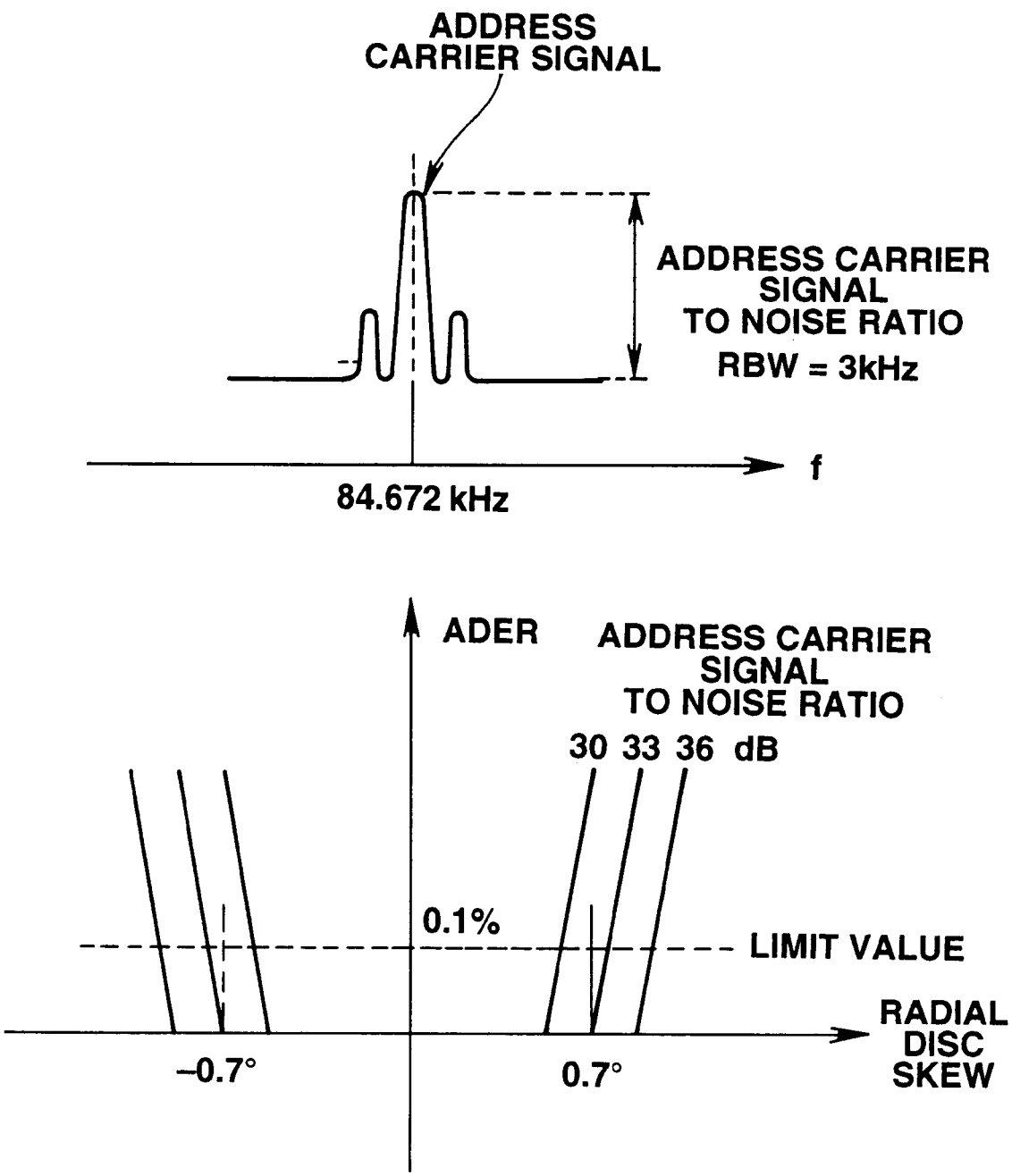
FIG. 18 is a graph showing the relation between radial skew and an error rate ADER.

The wobbled signals were reproduced by an optical system having a laser light wavelength of 660 nm and a lens NA of 0.52 to read out the address information. The address error rate (ADER) at this time was measured as the skew was applied in the radial direction. The results are shown in FIG. 18, from which it is seen that, for assuring the skew margin with the allowable limit value of ±0.7 degree or more of the skew margin with the allowable limit value of ADER not more than 0.1%, the ratio of the address carrier signal (84.672 kHz) to noise of not less than 33 dB (RBW 3 kHz) is required.

Read-Only Optical Disc

Under the following conditions, a read-only optical disc was prepared:
substrate thickness: 64 mm
pit depth: 70 nm
pit width: 0.37 $\mu$m
track structure: single spiral
track pitch: 0.95 $\mu$m
substrate thickness: 1.18 mm
refractive index of the substrate: 1.57 (polycarbonate substrate)
in-plane double refraction: $20 \times 10^{-6}$
(1,7)RLL modulated bit length: 0.34 $\mu$m
reflective film: Al This optical disc was reproduced under the following conditions:
linear velocity: 2.00 m/s
laser light wavelength: 660 nm
lens NA: 0.52
reproducing light power: 0.8 mW The push-pull signal was 0.03 such that sufficient tracking characteristics could be obtained. The standard deviation of the jitter between data and clocks, as normalized with the clocks of 113 nm, was 8%. The skew margin in the radial direction and that in the running direction, as sliced with the jitter of 15%, were ±0.80° and ±0.65°, respectively. Measurements on various discs revealed that the jitter value for assuring the skew margin in the radial direction of not less than 0.75° and that for assuring the skew margin in the radial direction of not less than 0.60° were 8.4% or less.

Hybrid Optical Disc

Using a polycarbonate substrate having a diameter of 64.8 mm, a thickness of 1.18 mm, a refractive index of 1.57 and the in-plane double refraction of $20 \times 10^{-6}$, a hybrid optical disc having an area not larger than 45 nm in diameter designed as a read-only optical disc and having an area not less than 45 nm in diameter as a overwrite magneto-optical disc was prepared.

The read-only optical disc structure of the disc was as follows:
pit depth: 70 nm
pit width: 0.37 $\mu$m
track structure: single spiral
track pitch: 0.95 $\mu$m
(1,7) RLL modulated bit length: 0.34 $\mu$m.

The overwrite magneto-optical disc structure was as follows:
groove structure: double spiral intermittent wobbling
wobbling amplitude: 20 nm
groove depth: 70 nm
track pitch: 0.95 $\mu$m On the entire surface of the hybrid disc was formed a film for a magneto-optical disc and the read-only area of the disc was reproduced with the linear velocity of 2.00 m/s, a laser light wavelength of 660 nm, a lens NA of 0.52 and the reproducing light power of 0.8 mW. It was found that the push-pull signal was 0.03 such that sufficient tracking characteristics could be achieved.

The standard deviation of the jitter between data and clocks, as normalized with the clocks of 113 nm, was 8.2%. The skew margin in the radial direction and that in the running direction, as sliced with the jitter of 15%, were ±0.76° and ±0.63°, respectively.

(1,7) RLL random data were recorded by magnetic field modulation recording on the overwrite magneto-optical disc portion under the following conditions:
linear velocity: 2.00 m/s
laser light wavelength: 660 nm
lens NA: 0.52
bit length: 0.34 $\mu$m
recording power: 7.7 mW pulse light duty: 47%
recording magnetic field: 12 kA/m Measurements of the skew margin revealed that the skew margin in the radial direction and that in the running direction were ±0.75° and ±0.64°, which are higher than the values required for the system.

From the foregoing, it may be said that the hybrid optical disc having the read-only optical disc structure portion and the overwrite magneto-optical disc structure portion on the inner and outer rims thereof hold good system-wise and is useful depending on the application.

What is claimed is:

1. An optical disc having a double spiral structure defined by alternating straight and wobbled grooves and data recorded with a density pb of less than or equal to 0.326 $\mu m^2$, where p is track pitch and b is bit length, wherein, p is at least 0.90 $\mu m$ but not more than 1.00 $\mu m$, b is at least 0.326 $\mu m$ but not more than 0.363 $\mu m$, a perpendicular double refraction index of the disc is not greater than $300 \times 10^{-6}$, a land duty of the disk is 61 to 69%, jitter produced when random pattern signals are recorded on one track only is not more than 8.4% and jitter increase on recording of signals also on both sides of neighboring tracks is not more than 4.9%.

2. The optical disc as claimed in claim 1 wherein the disc has skew in the radial direction is not more than 0.3° and the disc skew in the circumferential direction is not more than 0.2°.

3. The optical disc as claimed in claim 1 wherein the information signals can be overwritten.

4. The optical disc as claimed in claim 3, comprising a photomagnetic recording layer in a recordable area of the disc.

5. The optical disc as claimed in claim 4 wherein the substrate has a thickness of 1.2±0.05 mm, a refractive index of 1.55±0.05.

6. The optical disc as claimed in claim 4 wherein with a recording power of not less than 0.8 Pw and not more than 1.1 Pw, where Pw is an optimum recording power, and with the recording magnetic field of not less than 12 kA/m and not more than 20 kA/m, jitter produced when random pattern signals are recorded on one track only is not more than 8.4% and jitter increase on recording signals also on both side neighboring tracks is not more than 4.9%.

7. The optical disc as claimed in claim 4 wherein the carrier wave to noise ratio on recording carrier signals of a sole frequency of 2.2 MHz is not less than 40 dB.

8. The optical disc as claimed in claim 1 wherein the ratio of the address signal n tracking the wobbled groove to the address signal on tracking the straight groove is not less than 10 dB.

9. The optical disc as claimed in claim 1 wherein the optical disc is a read-only disc having information signals recorded thereon by pits formed by crests and recesses.

10. The optical disc as claimed in claim 9 having a single spiral structure comprised of a sole groove.

11. The optical disc as claimed in claim 1 wherein the disc has a read-only area and an overwritable area on its inner and outer rim portions, with a mirror area of not more than 20 $\mu m$ in width defined between the read-only area and the overwritable area.

12. An optical device comprising an optical disc and an optical system for illuminating a recording light beam and/or a reproducing light beam on said optical disc, said optical disc having a double spiral structure defined by alternating straight and wobbled grooves and data recorded with a density pb of less than or equal to 0.326 $\mu m^2$, where p is track pitch and b is bit length, wherein, p is at least 0.90 $\mu m$ but not more than 1.00 $\mu m$, b is at least 0.326 $\mu m$ but not more than 0.363 $\mu m$, a perpendicular double refraction index of the disc is not greater than $300 \times 10^{-6}$, a land duty of the disk is 61 to 69%, the optical system has a wavelength of 635 o 680 nm and a numerical aperture NA of 0.52±0.02, and wherein recording and/or reproduction is carried out in a range of the track pitch not less than 0.0 $\mu m$ and not more than 1.00 $\mu m$, a bit length not less than 0.326 $\mu m$ and not more than 0.362 m and a product of the track pitch and the bit length not more than 0.326 $\mu m2$.

* * * * *